US011817006B2

(12) United States Patent
Becker et al.

(10) Patent No.: US 11,817,006 B2
(45) Date of Patent: Nov. 14, 2023

(54) WELD MODULES FOR WELD TRAINING SYSTEMS

(71) Applicants: ILLINOIS TOOL WORKS INC., Glenview, IL (US); SEABERY NORTH AMERICA INC., Annapolis, MD (US)

(72) Inventors: William Joshua Becker, Manitowoc, WI (US); Pedro Gerardo Marquínez Torrecilla, Annapolis, MD (US); Jesús Calvo Pérez, Huelva (ES); David Barroso de la Rosa, Huelva (ES); Victor López Márquez, Huelva (ES); Jose Miguel Escobar Garrido, Huelva (ES)

(73) Assignees: ILINOIS TOOL WORKS INC. ASSIGNEE, Glenview, IL (US); SEABERY NORTH AMERICA INC., Annapolis, MD (US)

( * ) Notice: Subject to any disclaimer, the term of this patent is extended or adjusted under 35 U.S.C. 154(b) by 165 days.

(21) Appl. No.: 16/793,768

(22) Filed: Feb. 18, 2020

(65) Prior Publication Data
US 2020/0265751 A1 Aug. 20, 2020

Related U.S. Application Data

(60) Provisional application No. 62/807,664, filed on Feb. 19, 2019.

(51) Int. Cl.
G09B 19/24 (2006.01)
G06F 3/01 (2006.01)
G09B 25/02 (2006.01)

(52) U.S. Cl.
CPC ............. *G09B 19/24* (2013.01); *G06F 3/016* (2013.01); *G09B 25/02* (2013.01)

(58) Field of Classification Search
CPC .......... G09B 19/24; B23K 9/09; B23K 9/095; B23K 9/0953
See application file for complete search history.

(56) References Cited

U.S. PATENT DOCUMENTS 2,043,331 A 6/1936 Notvest
2,175,891 A 10/1939 Graham
(Continued)

FOREIGN PATENT DOCUMENTS

CN 1538306 10/2004
CN 1746833 3/2006
(Continued)

OTHER PUBLICATIONS

International Search Report and Written Opinion, International Patent Application No. PCT/US2020/018836, dated May 19, 2020, 15 pages.
(Continued)

*Primary Examiner* — Robert J Utama
(74) *Attorney, Agent, or Firm* — McAndrews, Held & Malloy, Ltd.

(57) ABSTRACT

Systems are disclosed relating to a weld module for weld training systems. In some examples, a weld module is configured for attachment to (and/or detachment from) a plug of a welding tool (e.g., welding torch, gun, stinger, foot pedal, etc.). The weld module may be configured to detect tool events based one or more signals received from the plug of the welding tool. The weld module may communicate the tool events to the weld training system for use during a weld simulation, for example.

20 Claims, 13 Drawing Sheets

(56) References Cited

U.S. PATENT DOCUMENTS

| | | | |
|---|---|---|---|
| 2,526,597 A | 10/1950 | Winslow | |
| 2,617,913 A | 11/1952 | Oestreicher | |
| 2,642,515 A | 6/1953 | Bagg | |
| 3,567,902 A | 3/1971 | Stearns et al. | |
| 3,992,565 A | 11/1976 | Gatfield | |
| 4,051,344 A | 9/1977 | Robbins | |
| 4,079,231 A | 3/1978 | Toth | |
| 4,147,919 A | 4/1979 | Matasovic et al. | |
| 4,216,367 A | 8/1980 | Risberg | |
| 4,216,368 A | 8/1980 | Delay | |
| 4,227,066 A | 10/1980 | Bulwidas, Jr. | |
| 4,247,752 A | 1/1981 | Stringer | |
| 4,266,114 A | 5/1981 | Hansen | |
| 4,410,789 A | 10/1983 | Story | |
| 4,450,340 A | 5/1984 | Corrigall et al. | |
| 4,467,174 A | 8/1984 | Gilliland | |
| 4,508,954 A | 4/1985 | Kroll | |
| 4,521,672 A | 6/1985 | Fronius | |
| 4,531,045 A | 7/1985 | Kemp | |
| 4,561,059 A | 12/1985 | Davis et al. | |
| 4,641,292 A | 2/1987 | Tunnell et al. | |
| 4,767,908 A | 8/1988 | Dallavalle et al. | |
| 5,039,835 A | 8/1991 | Schwiete | |
| 5,043,557 A | 8/1991 | Tabata et al. | |
| 5,276,305 A | 1/1994 | Hsien | |
| 5,406,050 A | 4/1995 | Macomber et al. | |
| 5,708,523 A | 1/1998 | Kubo | |
| 6,040,555 A | 3/2000 | Tiller et al. | |
| 6,103,994 A | 8/2000 | Decoster et al. | |
| 6,156,999 A | 12/2000 | Ignatchenko et al. | |
| 6,423,936 B1 | 7/2002 | Reed | |
| 6,512,199 B1 | 1/2003 | Blazina | |
| 6,531,673 B2 | 3/2003 | Fedorcak | |
| 6,570,132 B1 | 5/2003 | Brunner et al. | |
| 6,624,388 B1 | 9/2003 | Blankenship et al. | |
| 6,781,095 B2 | 8/2004 | Hayes et al. | |
| 6,841,752 B2 | 1/2005 | Ward | |
| 6,906,285 B2 | 6/2005 | Zucker et al. | |
| 6,909,285 B2 | 6/2005 | Jordan et al. | |
| 7,045,742 B2 | 5/2006 | Feichtinger et al. | |
| 7,205,503 B2 | 4/2007 | Reynolds et al. | |
| 7,245,875 B2 | 7/2007 | Clark et al. | |
| 7,336,259 B2 | 2/2008 | Li et al. | |
| 7,381,922 B2 | 6/2008 | Ulrich | |
| 8,487,216 B2 | 7/2013 | Reynolds et al. | |
| 8,658,940 B2 | 2/2014 | Reynolds et al. | |
| 8,785,817 B2 | 7/2014 | Luck et al. | |
| 9,180,544 B2 | 11/2015 | Luck et al. | |
| 9,672,757 B2 | 6/2017 | Becker et al. | |
| 9,718,141 B2 | 8/2017 | Denis et al. | |
| 9,724,778 B2 | 8/2017 | Denis et al. | |
| 9,943,924 B2 | 4/2018 | Denis et al. | |
| 9,993,890 B2 | 6/2018 | Denis et al. | |
| 10,144,085 B2 | 12/2018 | Reynolds et al. | |
| 10,369,652 B2 | 8/2019 | Denis et al. | |
| 10,464,156 B2 | 11/2019 | Denis et al. | |
| 11,423,800 B2 | 8/2022 | Batzler | |
| 2003/0184515 A1 | 10/2003 | Tsai | |
| 2004/0026392 A1 | 2/2004 | Feichtinger et al. | |
| 2005/0155068 A1 | 7/2005 | Chang | |
| 2005/0199605 A1 | 9/2005 | Furman et al. | |
| 2006/0163227 A1 | 7/2006 | Hillen et al. | |
| 2008/0083121 A1* | 4/2008 | Cziraky | B25D 11/12 30/277.4 |
| 2013/0040270 A1* | 2/2013 | Albrecht | B23K 9/00 434/234 |
| 2014/0168443 A1* | 6/2014 | Aguilar | H04N 5/2256 348/158 |
| 2014/0263224 A1* | 9/2014 | Becker | G09B 19/24 219/124.5 |
| 2014/0332515 A1 | 11/2014 | Luck | |
| 2015/0194073 A1* | 7/2015 | Becker | G09B 5/00 434/234 |
| 2016/0039035 A1 | 2/2016 | Luck | |
| 2017/0046975 A1 | 2/2017 | Becker et al. | |
| 2017/0046976 A1 | 2/2017 | Becker et al. | |
| 2018/0229324 A1 | 8/2018 | Denis et al. | |
| 2019/0105725 A1 | 4/2019 | Reynolds et al. | |

FOREIGN PATENT DOCUMENTS

| | | |
|---|---|---|
| EP | 0575082 | 12/1993 |
| EP | 1112800 | 7/2001 |
| EP | 1500456 | 1/2005 |
| EP | 1683599 | 5/2014 |
| JP | S61137675 | 6/1986 |
| JP | H04162964 | 6/1992 |
| JP | H04162966 | 6/1992 |
| JP | 2003088957 | 3/2003 |
| JP | 2003154455 | 5/2003 |
| JP | 2003191075 | 7/2003 |
| JP | 2003236663 | 8/2003 |
| WO | 0134337 | 5/2001 |
| WO | 02085566 | 10/2002 |
| WO | 2009146359 | 12/2009 |

OTHER PUBLICATIONS

Miller Electric Mfg. Co.; "Miller PC-300 Owner's Manual," Aug. 1989 (Aug. 1989), http://igor.chudov.com/manuals/Miller/Miller-PC-300-Pulse-Control_Manual.pdf., 24 pages.

Avocent, "LongView Wireless Installer/User Guide," 2005, http://site.i-techcompany.com/DataSheet/Avocent/lv5800UG.pdf., 32 pages.

Echelon, "PL 3120 / PL 3150 Power Line Smart Transceiver Data Book," Version 2, 005-0154-01, 1996-2005, 255 pgs.

Hackl et al., "Digitally Controlled GMA Power Sources," Fronius, www.fronius.com/worldwide/USA/products/paper_digitally_controlld_power_sources_gb.pdf, pp. 1-7, publication date not provided.

Intellon, "CEBus Power Line Encoding and Signaling," White Paper #0027, Mar. 1997, Version 0.1, 6 pages.

Agere Systems, Inc. et al., Wireless Universal Serial Bus Specification, Revision 1.0, May 12, 2005, 303 pages.

American Welding Society, "Welding Journal, Special Emphasis: Computer Technology in Welding," vol. 79, No. 1, https://app.aws.org/wj/2000/01/WJ_2000_01.pdf, Jan. 2000, 141 pages.

D-Link, "D-Link AirPlus G DWL-G730AP: 802.11g/2.4GHz Wireless Pocket Router/AP," http://www.dlink.com/-/media/Consumer_Products/DWL/DWL%20G730AP/Manual/DWLG730AP_Manual_EN_UK.pdf, Aug. 10, 2004, 79 pages.

Scientific Atlanta, "WebSTAR Model DPW941 Wireless Ethernet Adapter User's Guide," http://www.cisco.com/web/consumer/support/userguides2/738183.pdf, Apr. 2005, 60 pages.

European Patent Office, Office Action, Application No. 20715513.6, dated Oct. 10, 2022, 8 pages.

Canada Patent Office, Office Action, Application No. 3,130,588 dated Sep. 5, 2023, 4 pages.

* cited by examiner

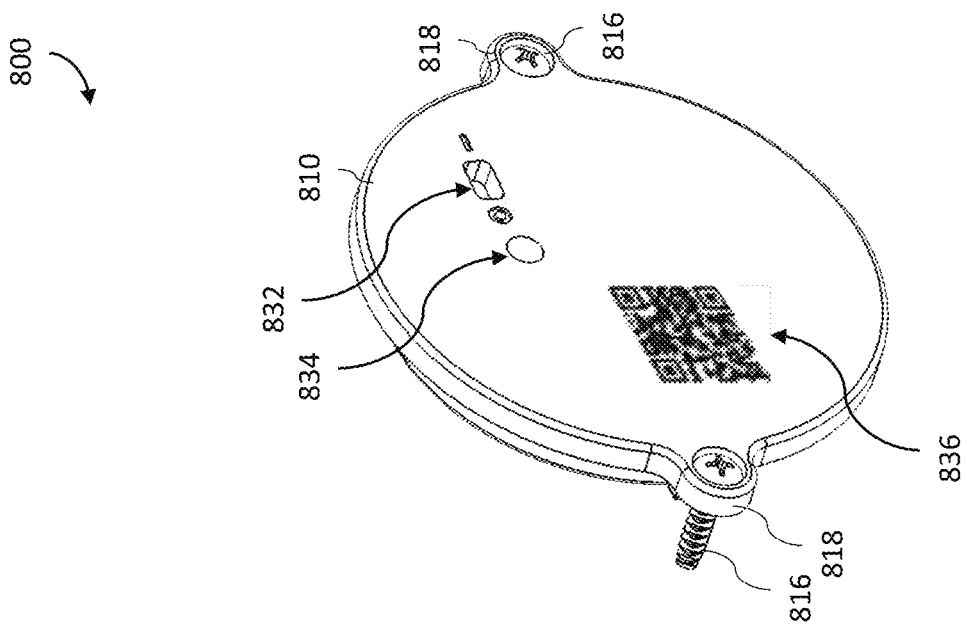
FIG. 8B
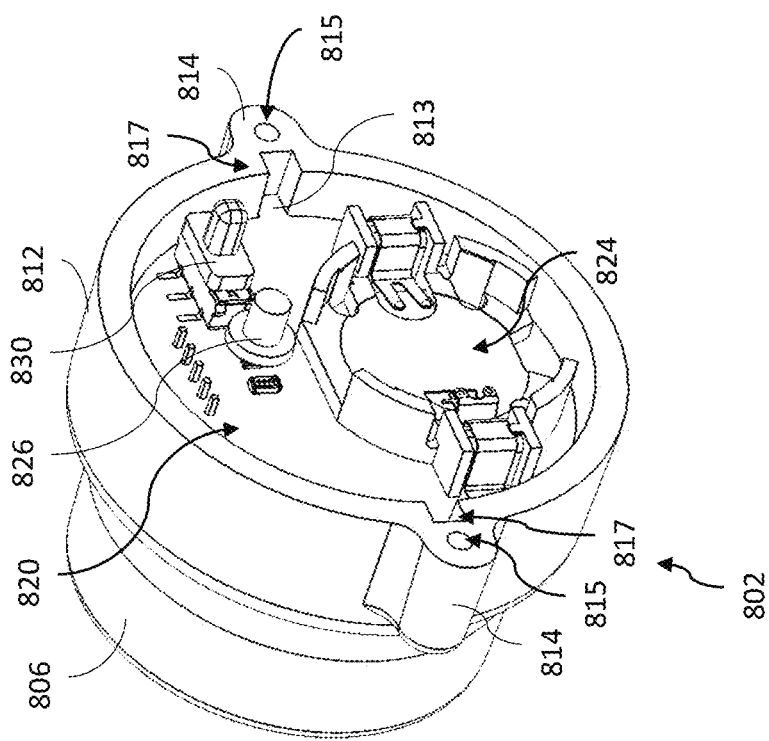

WELD MODULES FOR WELD TRAINING SYSTEMS

CROSS REFERENCE TO RELATED APPLICATIONS

The present application claims the benefit of U.S. Provisional Patent Application Ser. No. 62/807,664, filed Feb. 19, 2019, entitled "WELD MODULES FOR WELD TRAINING SYSTEMS," the entire contents of which are expressly incorporated herein by reference.

TECHNICAL FIELD

This disclosure relates to weld modules and, more particularly, to weld modules for weld training systems.

BACKGROUND

The welding industry has a shortage of experienced and skilled operators. Additionally, it is difficult and expensive to train new operators using live welding equipment. Further, even experienced welders often have difficulty maintaining important welding techniques throughout welding processes. Thus, there is a demand for affordable training tools and equipment that help operators develop, maintain, and/or refine welding skills.

Weld training simulations make it possible for both experienced and inexperienced weld operators to practice producing high quality welds prior to actually using the real welding equipment. However, conventional weld training simulation systems require substantial investments in specialized equipment (e.g., processors, displays, practice workpieces, practice welding tool(s), sensor(s), etc.).

SUMMARY

Weld modules for weld training systems are disclosed, substantially as illustrated by and described in connection with at least one of the figures, as set forth more completely in the claims.

These and other advantages, aspects, and/or novel features of the present disclosure, as well as details of an illustrated example thereof, will be more fully understood from the following description and drawings.

DRAWINGS

Features, aspects, and/or advantages of the present disclosure will become better understood when the following detailed description is read with reference to the accompanying drawings in which like characters represent like parts throughout the drawings, wherein:

FIG. 8B is a perspective view of a second side of the example weld module of FIG. 6A.

Figure 1:
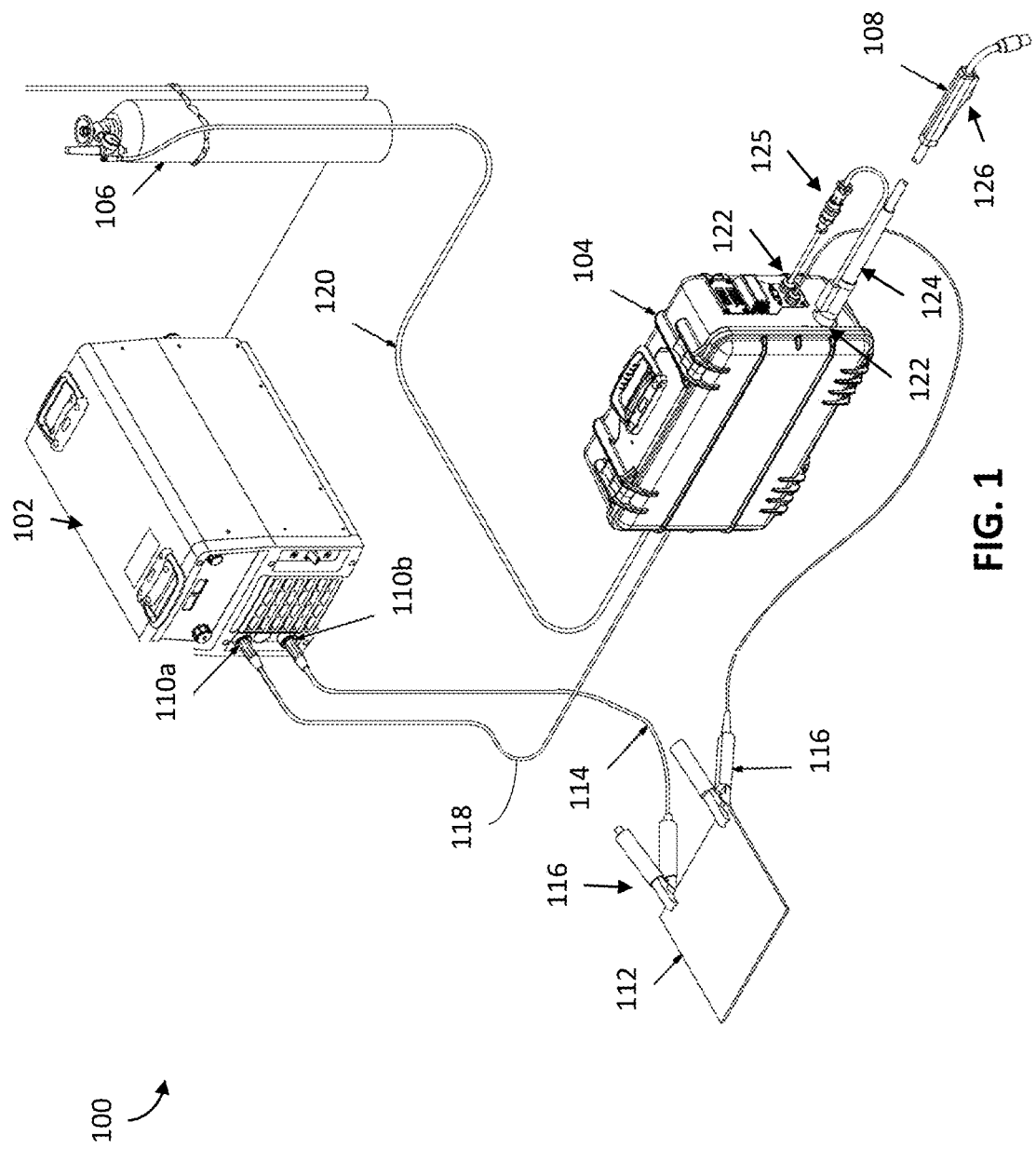
FIG. 1 illustrates a conventional welding-type system, in accordance with aspects of this disclosure.

The figures are not necessarily to scale. Where appropriate, similar or identical reference numbers are used to refer to similar or identical components. For example, reference numerals utilizing lettering (e.g., prong $330a$, prong $330b$) refer to instances of the same reference numeral that does not have the lettering (e.g., prongs 330)

DETAILED DESCRIPTION

Some weld training systems use specialized equipment. For example, some weld training systems may use specialized power supplies, wire feeders, and/or welding torches. However, such specialized equipment tends to be complicated and expensive. It may be more efficient and/or cost effective to instead adapt conventional equipment for training. Additionally, adapting conventional equipment may help to add to the realism and/or applicability of the training.

The present disclosure therefore contemplates using a weld module to connect with conventional equipment (e.g., conventional weld torches, wire feeders, and/or power supplies), so as to integrate the conventional equipment into a weld training system. In some examples, the weld module may be configured for attachment to (and/or detachment from) a conventional plug of a welding tool (e.g., welding torch, gun, stinger, foot pedal, etc.). The weld module may be configured to detect tool events based on one or more signals received from the plug of the welding tool. The weld module may communicate the tool events to the weld training system for use during a weld simulation, for example. The weld module may additionally be configured for secure attachment to a fixture (so as to secure otherwise loose and/or dangling cords) and/or a conventional socket of a welding-type power supply and/or wire feeder.

The present disclosure also contemplates an alternative weld module that may be used with a specialized mock welding tool. While there may be some additional cost to providing the specialized mock welding tool, the cost may be substantially less than the cost of an actual live welding tool. Further, using a mock welding tool for weld training ensures that no live welding tool is made unavailable for live welding.

Some examples of the present disclosure relate to a mock welding tool, comprising a handle having a trigger, and a communication module comprising: wireless communication circuitry configured to wirelessly send one or more signals to a computing system in response to activation of the trigger, and a module housing enclosing the communication circuitry, the module housing being coupled to the handle.

In some examples, a trigger signal is generated when the trigger is activated and the wireless communication circuitry is configured to receive the trigger signal. In some examples, the mock welding tool further comprises a trigger circuit configured to generate the trigger signal when the trigger is activated. In some examples, the mock welding tool further comprises a panel securing the communication module to the handle. In some examples, the handle comprises a recessed portion that retains the panel and an end portion coupled to the module housing.

In some examples, the module housing further comprises an identifier that assists in communicatively pairing the mock welding tool with the computing system. In some examples, the module housing comprises a base that retains the wireless communication circuitry and a cover configured to attach to the base. In some examples, the mock welding tool further comprises an illuminator configured to provide illumination when the wireless communication circuitry is powered, paired, transmitting, or receiving. In some examples, the mock welding tool further comprises a vibrator configured to vibrate in response to a vibration signal. In some examples, the mock welding tool further comprises a sensor configured to measure a position, orientation, or motion of the communication module, wherein the wireless communication circuitry is configured to transmit a signal indicative of the position, orientation, or motion.

Some examples of the present disclosure relate to a detachable communication module for a welding tool, comprising: a housing configured for attachment to a connector of a welding cable, and circuitry retained by the housing such that the circuitry is in electrical communication with the connector when the housing attaches to the plug, the circuitry configured to detect a tool event via the connector, and transmit a signal to a weld training system that is separate from the detachable communication module in response to the tool event.

In some examples, the signal is indicative of a type of tool event, the circuitry being configured to determine the type of tool event via the connector, the type of tool event comprising an activation event, a deactivation event, a pressure increase event, or a pressure decrease event. In some examples, the circuitry is configured to detect the tool event and/or determine a type of tool event based on a change in voltage across the connector. In some examples, the circuitry is configured to be communicatively paired with complementary communication circuitry via a wireless communication protocol.

In some examples, the housing comprises: receptacles configured to receive the connector, and a chamber configured to house the circuitry, the receptacles leading to the chamber. In some examples, the detachable communication module further comprises an input mechanism in electrical communication with the circuitry, the input mechanism configured to trigger a signal transmission by the circuitry, and an output mechanism in electrical communication with the circuitry, the output mechanism configured to indicate status or identification information. In some examples, the housing is further configured for attachment to a clamp, clip, weight, or fixture. In some examples, the detachable communication module further comprises a vibrator in electrical communication with the circuitry, the vibrator configured to activate in response to detecting a tool event or in response to receipt of one or more welding parameters by the circuitry. In some examples, the detachable communication module further comprises a port receptacle configured to provide power to the circuitry. In some examples, the connector comprises a first connector, and the detachable communication module further comprises a second connector configured for electrical communication with the first connector, wherein the housing is further configured for attachment to a socket configured to receive the second connector.

FIG. 1 shows an example of a conventional welding-type system 100, such as may be used to conduct conventional welding-type operations, for example. In some examples, the example welding-type system 100 shown in FIG. 1 may be used to conduct gas metal arc welding (GMAW) processes. In some examples, the welding-type system 100 may also be used with other arc welding processes (e.g., flux-cored arc welding (FCAW), gas shielded flux-cored arc welding (FCAW-G), gas tungsten arc welding (GTAW), submerged arc welding (SAW), shielded metal arc welding (SMAW), or similar arc welding processes). In some examples, the welding-type system 100 may be used with metal fabrication systems, such as plasma cutting systems, induction heating systems, and so forth.

In the example of FIG. 1, the welding-type system 100 includes a welding-type power supply 102 (i.e., a welding-type power source), a welding wire feeder 104, a gas supply 106, and a welding torch 108. In some examples, the welding-type power supply 102 generally supplies welding-type power for the various welding-type components and/or accessories of the welding-type system 100 (e.g., the welding wire feeder 104 and/or welding torch 108) through plug and socket connections 110. In the example of FIG. 1, the welding-type power supply 102 is coupled to the welding wire feeder 104 and workpiece 112 through the plug and socket connections 110. One plug and socket connection 110b is coupled to one or more lead cables 114 that lead to the workpiece 112 through the work clamp 116, while another plug and socket connection 110a is connected to one or more weld cables 118 which lead to the wire feeder 104. In the example of FIG. 1, the gas supply 106 is coupled to the welding torch 108 through the wire feeder 104 via a gas conduit 120.

In the example of FIG. 1, the wire feeder 104 includes sockets 122 connected to a power plug 124 and trigger plug 125 of the welding torch 108. In some examples, welding-type power may be supplied to the welding torch 108 via connection of the power plug 124 and the socket 122. In some examples, filler material (e.g., wire) and/or gas from the gas supply 106 may also be supplied to the welding torch 108 via connection of the power plug 124 and the socket 122. In some examples, signals from activation/deactivation of the trigger 126 of the welding torch 108 may be communicated to the wire feeder 104 and/or power supply 102 through connection of the trigger plug 125 and socket 122. In some examples, the welding-type power supply 102 may instead directly couple to the power plug 124 and/or trigger plug 125 of the welding torch 108, such that power, filler material, gas, and/or trigger signals may be directly transmitted therethrough (e.g., via plug and socket connection 110b). In operation, an operator may engage a trigger 126 of the torch 108 to initiate an arc (and/or other welding-type operation) between the torch 108 and the workpiece 112.

However, as previously discussed, there are several issues with using conventional welding systems (e.g., as shown in FIG. 1) for weld training. Thus, separate weld training systems are sometimes used instead. Some of these weld training systems simulate welding operations rather than actually performing welding operations.

Figure 2:
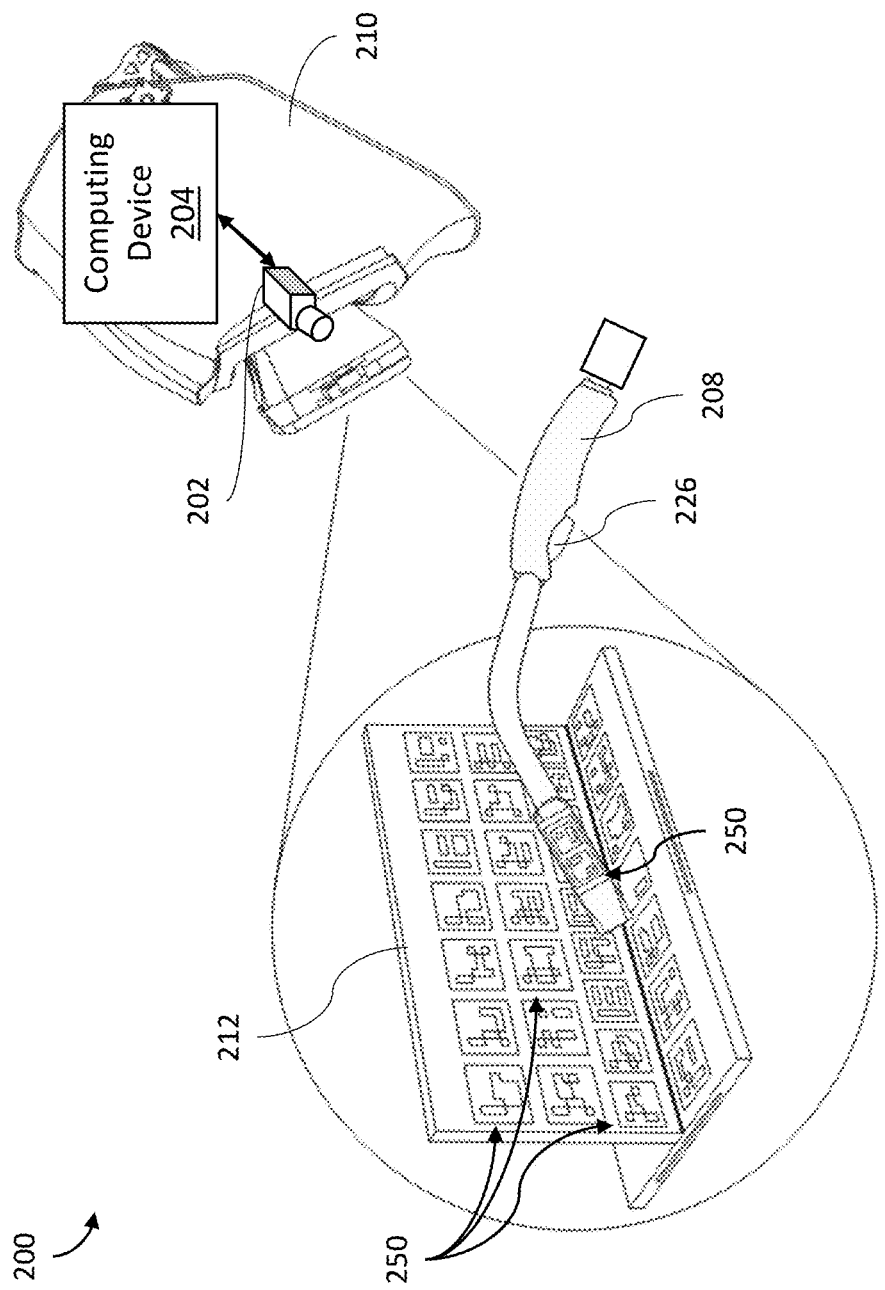
FIG. 2 illustrates an example weld training system, in accordance with aspects of this disclosure.

FIG. 2 illustrates an example weld training system 200. As shown, the weld training system 200 includes a sensor 202 (e.g., a camera, an optical sensor, a sound sensor, etc.), a computing device 204, a mock workpiece 212, a welding tool 208 (e.g., welding torch), and a welding helmet 210. In some examples, the welding helmet 210 may comprise a pair of goggles, a headgear combining goggles and some sort of helmet, a mobile device mount attached to a headgear, and/or some other face and/or head mounted wearable assembly. In the example of FIG. 2, the sensor 202 is positioned on or within (or otherwise retained by) the welding helmet 210 (and/or associated helmet assembly). While only one sensor 202 is shown in the example of FIG. 2, in some examples, the weld training system 200 may include more than one sensor 202. As shown, the sensor 202 is configured to sense (e.g., view, see, hear, and/or otherwise detect) a mock workpiece 212 and/or a welding tool 208 of the weld training system 200.

In the example of FIG. 2, the weld training system 200 further includes a computing device 204. In some examples, the computing device 204 may be a smartphone, tablet, personal digital assistant, electronic book reader, ipod, laptop, desktop computer, mainframe computer, server computer, and/or other appropriate computational apparatus. As shown, the computing device 204 is also positioned in (and/or retained by) the welding helmet 210 (and/or associated helmet assembly). In some examples, the computing device 204 may instead be located remote from the welding helmet 210.

In the example of FIG. 2, the computing device 204 is in communication with the sensor 202. Such communication may be through a wired and/or wireless connection. In operation, the sensor 202 may detect certain characteristics of the surrounding environment (e.g., the mock workpiece 212 and/or welding tool 208) and the computing device 204 may analyze those characteristics to generate a (e.g., augmented, mixed, and/or virtual reality) weld training simulation. For example, the sensor 202 may capture images of the environment, and the computing system may analyze those images (e.g., using computer vision techniques) as well as other information to simulate a welding operation (e.g., with a simulated arc, weld pool, debris, etc.).

In the example of FIG. 2, the mock workpiece 212 and welding torch 20 include markers 250 to assist with recognition by the sensor 202 and/or computing device 204. As shown, the markers 250 are pattern markers. In some examples, each marker 250 may be a unique pattern. In some examples, no markers 250 may be used on the welding tool 208 and/or mock workpiece 212.

While, in the example of FIG. 2, the weld training system 200 uses a mock workpiece 212, in some examples, a real workpiece may be used instead. However, there is little advantage (and several drawbacks) to using real workpieces. Though specialized weld training equipment can be expensive to buy and/or make, mock workpieces 212 are a relatively inexpensive exception.

Welding tools (e.g., torches) are a different matter. Specialized weld tools can indeed be expensive to buy and/or make. Nevertheless, some weld training systems must use specialized welding tools out of necessity. This is because the weld training systems must know when a trigger (and/or foot pedal) is activated in order to operate.

As discussed above, conventional welding tools (e.g., torches and/or foot pedals) activate welding operations when a user pulls a trigger (or presses a pedal). The activation of the trigger or pedal causes a signal indicative of the activation to be transmitted to the wire feeder 104 and/or welding-type power supply 102 (e.g., through connection trigger plug 125). In order for the weld training system 200 to effectively simulate welding operations, the weld training system 200 also requires some sort of indication of trigger activation and/or deactivation.

However, most computing devices 204 are not configured to receive a trigger plug 125. Thus, in order for the computing device 204 to obtain an indication of trigger activation, some sort of adaptation is necessary. One solution is to try and adapt the computing device 204 to receive and/or interpret signals from the conventional trigger plug 125. Another solution is to customize a conventional wire feeder 104 and/or power supply 102 to somehow transmit a trigger signal to the computing device 204. Another solution is to create a customized welding torch that can connect to the computing device 204 (e.g., via universal serial bus (USB)). Unfortunately, all these solutions may require significant investments of time and/or money.

The present disclosure contemplates a different solution. In particular, the present disclosure contemplates a weld module attachable to (and/or detachable from) conventional trigger plugs 126 (and/or other appropriate plugs). Control circuitry within the weld module may be configured to interpret trigger signals received through the trigger plug 125, and communication circuitry may be configured to communicate this information to the weld training system 200. Such a weld module may be relatively inexpensive to produce, easy to use, and allow for incorporation with conventional welding equipment, which may help to add to the cost efficiency, realism, and/or applicability of the training.

Figure 3:
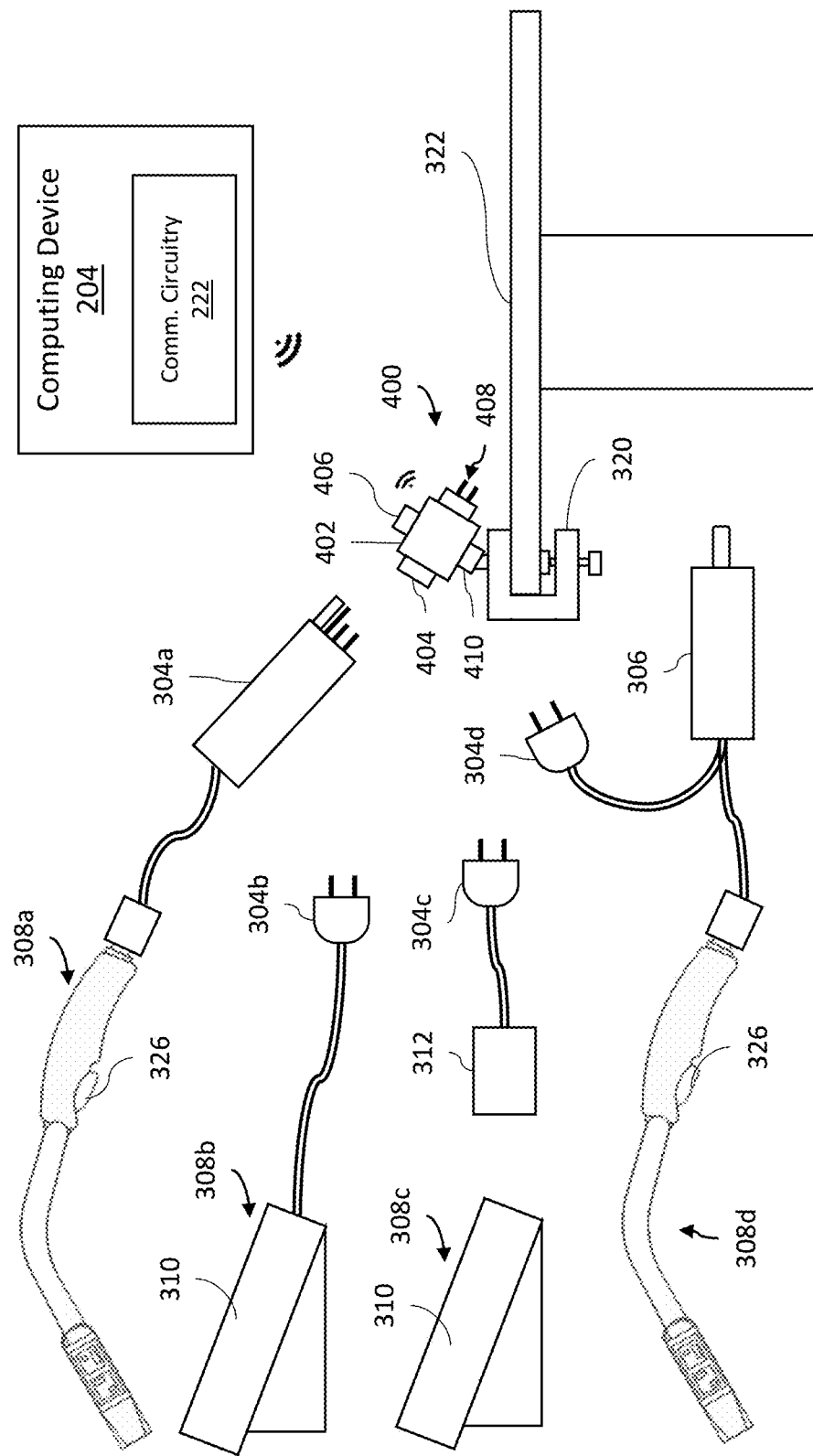
FIG. 3 illustrates an example weld module, several example welding tools, and the weld training system of FIG. 2, in accordance with aspects of this disclosure.
Figure 4A:
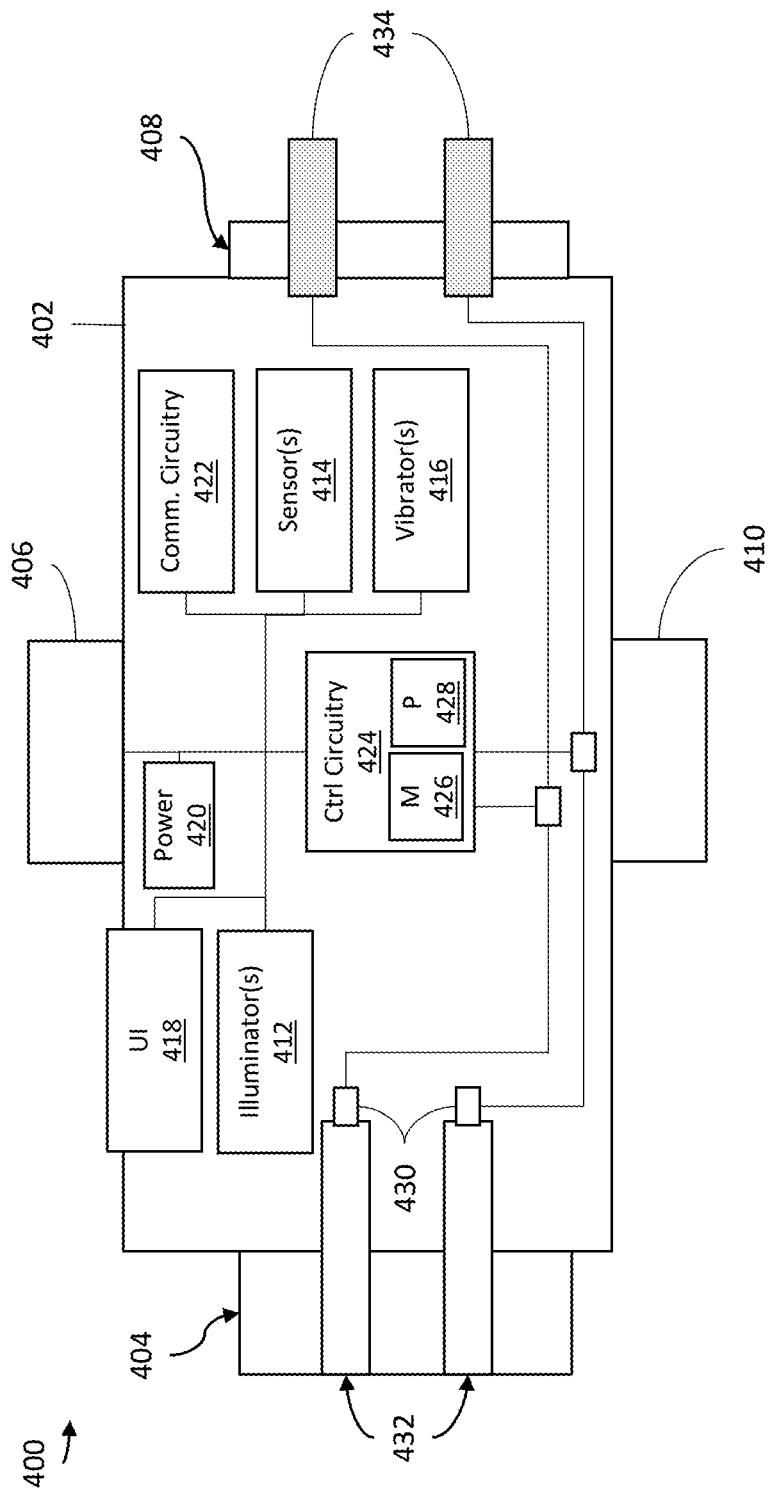
FIG. 4A is a block diagram illustrating components of the example weld module of FIG. 3, in accordance with aspects of this disclosure.

FIGS. 3 and 4A show examples of a weld module 400. As shown, the weld module 400 includes a housing 402 having a socket connector 404 configured for attachment to a plug 304 of a welding tool 308. Using information transmitted via prongs of the plug 304, the weld module 400 may detect one or more tool events. As shown, the weld module 400 may communicate tool event information to communication circuitry 222 of the computing device 204. While this communication is indicated as being wireless in the example of FIG. 3, in some examples, the communication may be over a wired link. The computing device 204 may then use this tool event information to conduct a weld training simulation.

In the example of FIG. 3, several welding tools 308 with several different plugs 304 are shown. As shown, the welding tool 308a and welding tool 308d are welding torches or guns, such as a torch or gun configured for gas metal arc welding (GMAW). In some examples, the welding tool 308a and/or welding tool 308d may be guns configured for flux-cored arc welding (FCAW). In the example of FIG. 3, the welding tool 308b and welding tool 308c are foot pedals (having pedals 310) such as may be used with a torch and/or filler rod configured for gas tungsten arc welding (GTAW). As shown, the welding tool 308b has a plug 304b that is wired to the foot pedal, while the welding tool 308c is a wireless foot pedal configured to wirelessly communicate with a receiver 312 that is wired to plug 304c.

In the example of FIG. 3, the plug 304b and plug 304c are shown with two prongs for ease of understanding. In some examples, these prongs may be used to communicate signals indicative of activation/deactivation of a pedal 310. In some examples, the plug 304b and/or plug 304c may be differently configured, with more, less, and/or different prongs (and/or other connectors). In the example of FIG. 3, the welding tool 308a has a European (and/or Chinese) style plug 304a with several prongs (and/or connectors) for transmission of gas, wire, power, and trigger signals through the plug 304c. The welding tool 308d, in contrast, has a U.S. style plug 304d that includes only two prongs for transmission of trigger signals, while a separate power plug 306 handles transmission of power, gas, and/or wire. In some examples, the weld module 400 may have a socket connector 404 detachable from the housing 402, such that the socket connector 404 may be swapped for a different socket connector 404 configured for the applicable type of plug 304.

In the examples of FIGS. 3 and 4A, the weld module 400 further includes a port 406 configured to couple the weld module 400 to an external power source and/or external device. In some examples, the port 406 may comprise, for example, an Ethernet port, a USB port, an HDMI port, a fiber-optic communications port, and/or any other suitable port for interfacing with a wired cable. In some examples, the port 406 may be a multi-purpose port which can be used for send and/or receiving both power and data.

As shown, the weld module 400 further includes its own plug connector 408. In some examples, the plug connector 408 may be detachable and/or swappable, so that a plug connector 408 that shares the same configuration as the plug 304 may be used. Using the plug connector 408, the weld module 400 may be able to connect to the same socket of conventional welding equipment (e.g., power supply 102 and/or wire feeder 104) to which the plug 304 of the welding tool 308 would normally connect. In some examples, the weld module 400 may also route transmissions through the weld module (e.g., to/from the socket connector 404 and/or plug connector 408), so as to allow the same information, power, gas, and/or filler material to pass through the weld module 400 to and/or from the welding equipment and/or welding tool 308.

In the examples of FIGS. 3 and 4A, the weld module 400 further includes a fixture connector 410. As shown, the weld module 400 is connected to a clamp 320 through the fixture connector 410. The clamp 320 is, in turn, secured to a table 322. By securing the weld module 400 to the table 322 via the clamp 320, the weld module 400 may prevent cables connecting the welding tool 308 to the plug 304 from dangling loose and/or unsecured in examples where the weld module 400 does not connect to conventional welding equipment.

In some examples, the fixture connector 410 may include connecting features (e.g., screw threads, screws, bolts, screw holes, bolt holes, hook and loop connectors, magnetic features, etc.) to enable connection with the clamp 320. In some examples, the clamp 320 may include complementary connecting features, and/or include a specialized attachment mechanisms having the complementary connecting features, so as to facilitate connection to the weld module 400. In some examples, the clamp 320 may instead be a clip, weight, and/or some other securing fixture. In some examples, the clamp 320 may be integrated with the weld module 400

FIG. 4A illustrates electrical components of the weld module 400. As shown, the weld module 400 includes one or more illuminators 412, one or more sensors 414, one or more vibrators 416, a user interface (UI) 418, a power source 420, communication circuitry 422, and control circuitry 424 in electrical communication with one another. In the example of FIG. 4A, the control circuitry 424 includes memory 426 and one or more processors 428. As shown, the control circuitry 424 is in electrical communication with the illuminator(s) 412, sensor(s) 414, vibrator(s) 416, UI 418, and communication circuitry 422. In some examples, the components of the weld module 400 may reside on one or more printed circuit boards (PCBs) and/or flex circuits. In some examples, the power source 420, the port 406, the illuminator(s), the UI 418, the sensor(s) 414, and/or the vibrator(s), may be realized as subsystems (e.g., implemented on separate PCBs and/or attached to primary PCB of the weld module 400).

Though not shown for the sake of simplicity, the power source 420 may be in electrical communication with the illuminator(s) 412, sensor(s) 414, vibrator(s) 416, UI 418, control circuitry 424, and/or communication circuitry 422 through separate electrical connections, to provide power. The power source 420 may comprise, for example, a battery (e.g., a lithium ion or sodium ion or lithium polymer or dual carbon battery), circuitry for charging the battery from an AC and/or DC power source, and/or circuitry for conditioning/delivering energy from the battery to the other circuitry of the weld module 400. In some examples, the power source 420 may receive and/or provide power from/to external devices through the port 406.

In some examples, the illuminator(s) 412 may be one or more light emitting diodes (LEDs). In some examples, the illuminator(s) 412 may be configured and/or controlled (e.g., via control circuitry 424) to light up and/or blink when the communication circuitry 422 is successfully paired and/or actively communicating (e.g., with communication circuitry 222). In some examples, the illuminator(s) 412 may be configured and/or controlled (e.g., via control circuitry 424) to light up and/or blink when the welding tool 308 is activated (e.g., via activation of trigger 326 or pedal 310), so as to visually indicate that the activation has taken place. In some examples, the illuminator(s) 412 may be configured and/or controlled (e.g., via control circuitry 424) to light up and/or blink when the weld module 400 is powered on. In some examples, the illuminator(s) 412 may be a separate device configured to attach to and/or detach from the weld module 400 (e.g., via port 406).

In some examples, the UI 418 may include, for example, one or more display screens, touchscreen elements, microphones, speakers, physical buttons (and/or switches, knobs, dials, keys, etc.), gesture controls, biometric sensors, and/or other types of input and/or output devices. For example, the UI 418 may include capacitive, acoustic, inductive, and/or resistive touchscreen sensors that enable a user to interact with graphics displayed on the UI 418. In some examples, outputs mechanisms (e.g., display screen, speakers, etc.) of the UI 418 may be configured to output status information (e.g., connection/communication/pairing status, power status, simulation settings, etc.) of the weld module 400.

In some examples, the UI 418 may include an on/off input mechanism operable to activate and/or deactivate power to the weld module 400. In some examples, the UI 418 may include an input mechanism operable to activate a pairing process between the communication circuitry 422 of the weld module 400 and some other communication circuitry (e.g., communication circuitry 222 of computing device 204). In some examples, the pairing may comprise a process for establishing wireless communication (via an appropriate wireless communication protocol) between the communication circuitry 422 of the weld module 400 and some other communication circuitry (e.g., communication circuitry of the computing device 204). In some examples, the weld module 400 may be marked with an identification number (e.g., serial number) and/or identification pattern (e.g., barcode, QR code, etc.) to assist with the pairing. In some examples, the identification number and/or identification pattern may be stored in memory 426 and/or displayed to the user via a display of the UI 418. In some examples, the sensor(s) 414 may assist with the pairing.

In some examples, the sensor(s) 414 may include infrared and/or ultrasonic sensors, accelerometers, gyroscopes, inertial measurement units (IMUs), near field communication (NFC) sensors, radio frequency identification (RFID) sensors, Bluetooth sensors, and/or the like. The sensor(s) 414 may include one or more inertial measurement units (IMUs) such as multi-axis gyroscopes, multi-axis accelerometers, and/or multi-axis magnetometers to detect, encode, and/or measure movement of the weld module 400. In some examples, the sensor(s) 414 may be a separate device configured to attach to and/or detach from the weld module 400 (e.g., via port 406).

In some examples, the vibrator(s) 416 may be configured to provide vibration and/or haptic feedback to an operator of the welding tool 308 during weld training. For example, the vibrator(s) 416 may be used to simulate vibrations that would be felt during actual welding due to the arc and/or filler material (e.g., wire) feeding process. In some examples, the control circuitry 424 may control the vibrator(s) 416 to activate and/or deactivate in response to detection of one or more tool events. In some examples, the vibrator(s) 416 may be a separate device configured to attach to and/or detach from the weld module 400 (e.g., via port 406).

In some examples, the communication circuitry 422 is configured to communicate with one or more external devices, such as, for example, communication circuitry 222 of the computing device 204, and/or other communication circuitry in third party devices, remote servers, and/or conventional welding equipment. In some examples, the communication circuitry 422 may include an antenna configured to facilitate this communication. In some examples, the communication circuitry 422 may facilitate communication through a wired connection (e.g., through port 406). In some examples, the communication circuitry 422 may facilitate communication through one or more wireless communication protocols. Wireless protocols may include, for example, cellular protocols (e.g., GSM, IS-95, UMTS, CDMA, LTE, etc.), IEEE 802.15.4 based protocols in the 2.4 GHz industrial, scientific, and medical (ISM) radio band (commonly known as Zigbee), low frequency magnetic signal protocols being transmitted at a frequency of approximately 131-134 kHz in conformance with IEEE 1902.1 standard (commonly known as Rubee), short wavelength ultra high frequency radio communication protocols in the 2.400 to 2.485 GHz ISM band in conformance with IEEE 802.15.1 standard (commonly known as Bluetooth), communication protocols in conformance with the IEEE 802.11 standard (commonly known as Wifi), and/or other appropriate communication protocols.

In some examples, the control circuitry 424 is configured to process data from, and/or send data (e.g., control signals) to, the components of the weld module 400. In the example of FIG. 4A, the control circuitry 424 is in electrical communication with electrical contacts 430 positioned at the end of receptacles 432 formed in the socket connector 404 of the weld module 400. In operation, the electrical contacts 430 may come into contact with prongs 330 of a plug 304 connected to the weld module 400 (see, e.g., FIG. 4B). Thus, electrical signals from the welding tool 308 may be communicated to the control circuitry 424 of the weld module 400 via the electrical pathway of the prongs 330 and contacts 430. In some examples, the control circuitry 424 may include one or more current and/or voltage sensors configured to measure the current through, and/or voltage across, the contacts 430.

In the example of FIG. 4A, the electrical contacts 430 are also in electrical communication with tines 434 of the plug connector 408 of the weld module 400. Thus, in operation, electrical signals from the welding tool 308 may be communicated to the plug connector 408 of the weld module 400 via the electrical pathway of the prongs 330 and contacts 430. In this way, data from the welding tool 308 may be communicated both to the weld module 400 and through the weld module 400 (e.g., to conventional welding equipment). In some examples, the plug connector 408 and/or socket connector 404 of the weld module 400 may include additional tines 434 and/or receptacles 432, so as to route additional inputs/outputs of welding equipment and/or the welding tool 308 (e.g., welding-type power, gas, filler material, signals, etc.) through the weld module 400.

In operation, the control circuitry 424 may determine whether a tool event has occurred based on one or more signals received from the prongs 330 and/or contacts 430. In some examples, a tool event may comprise a change in a state of the welding tool 308. For example, a tool event may include one or more of a pull of a trigger 326, a release of a trigger 326, a press of a pedal 310, a release of a pedal 310, and/or a change (e.g., increase and/or decrease) in pressure on a trigger 326 and/or pedal 310. In some examples, a tool event may be communicated from the welding tool 308 by a change in voltage across the prongs 330 of the plug 304 of the welding tool 308.

Figure 4B:
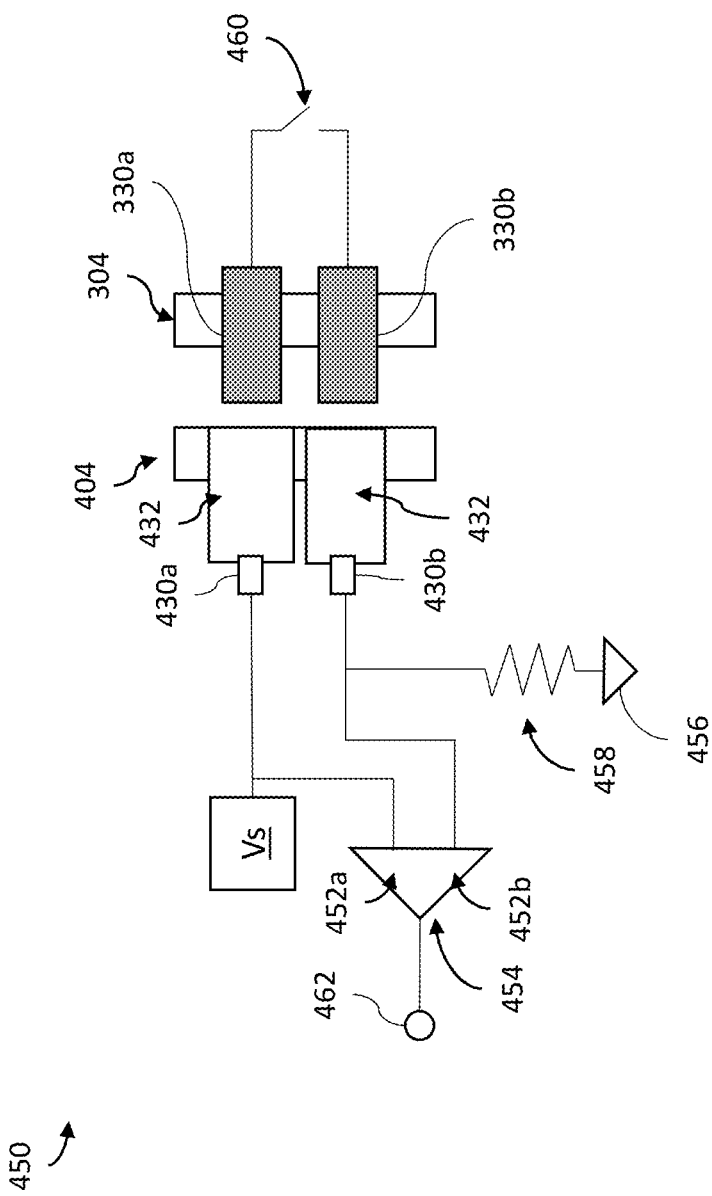
FIG. 4B is a circuit diagram illustrating an example portion of control circuitry of the example weld module of FIG. 4A, in accordance with aspects of this disclosure.

FIG. 4B is an example of a logic circuit 450 that may be used to determine whether a tool event has occurred, and/or determine a type of tool event. In some examples, the logic circuit 450 may be part of the control circuitry 424. In some examples, the logic circuit 450 may be implemented in digital and/or analog circuitry, discrete and/or integrated circuitry, microprocessors, DSPs, software, hardware and/or firmware.

In the example of FIG. 4B, the logic circuit 450 includes a voltage source Vs in electrical communication with a first contact 430a and a first input 452a of a comparator 454. As shown, the logic circuit 450 further includes a second contact 430b in electrical communication with a second input 452b of the comparator 454. As shown, the second contact 430b is also in electrical communication with ground 456 (through resistor 458). As shown, first contact 430a and second contact 430b are positioned (at least partially) within receptacles 432, such that first contact 430a and second contact 430b will be electrically connected with first prong 330a and second prong 330b of the plug 304 when the plug 304 is coupled to the socket connector 404.

In the example of FIG. 4B, the first prong 330a and second prong 330b of the welding tool 308 may be electrically connected or electrically disconnected by a switch 460 in communication with a trigger 326 or pedal 310. In some examples, the switch 460 may be closed when the trigger 326 or pedal 310 is activated, and/or opened when the trigger 326 or pedal 310 is deactivated (or vice versa). When the switch 460 is closed, the voltage across the first contact 430a and second contact 430b (and/or first input 452a and second input 452b) may be approximately zero (and/or less than some minimum threshold). When the switch 460 is open, the voltage across the first contact 430a and second contact 430b (and/or first input 452a and second input 452b) may be non-zero (and/or greater than some minimum threshold). In some examples, the comparator 454 may detect the voltage across the first input 452 and second input 452 and send a signal indicative of the voltage to the output 462, which may be received and/or further processed by the control circuitry 424 (e.g., to control communication circuitry 422 to send a similarly indicative signal).

In some examples, the welding tool 308 may have a more complicated configuration (e.g., several switches in parallel with different resistors for each switch) to generate a range of voltages in response to a range of pressures on the trigger 326 and/or pedal 310. In some examples, there may be more than two receptacles 432, prongs 330, and/or inputs 452, and/or an entirely different implementation.

Figure 5A:
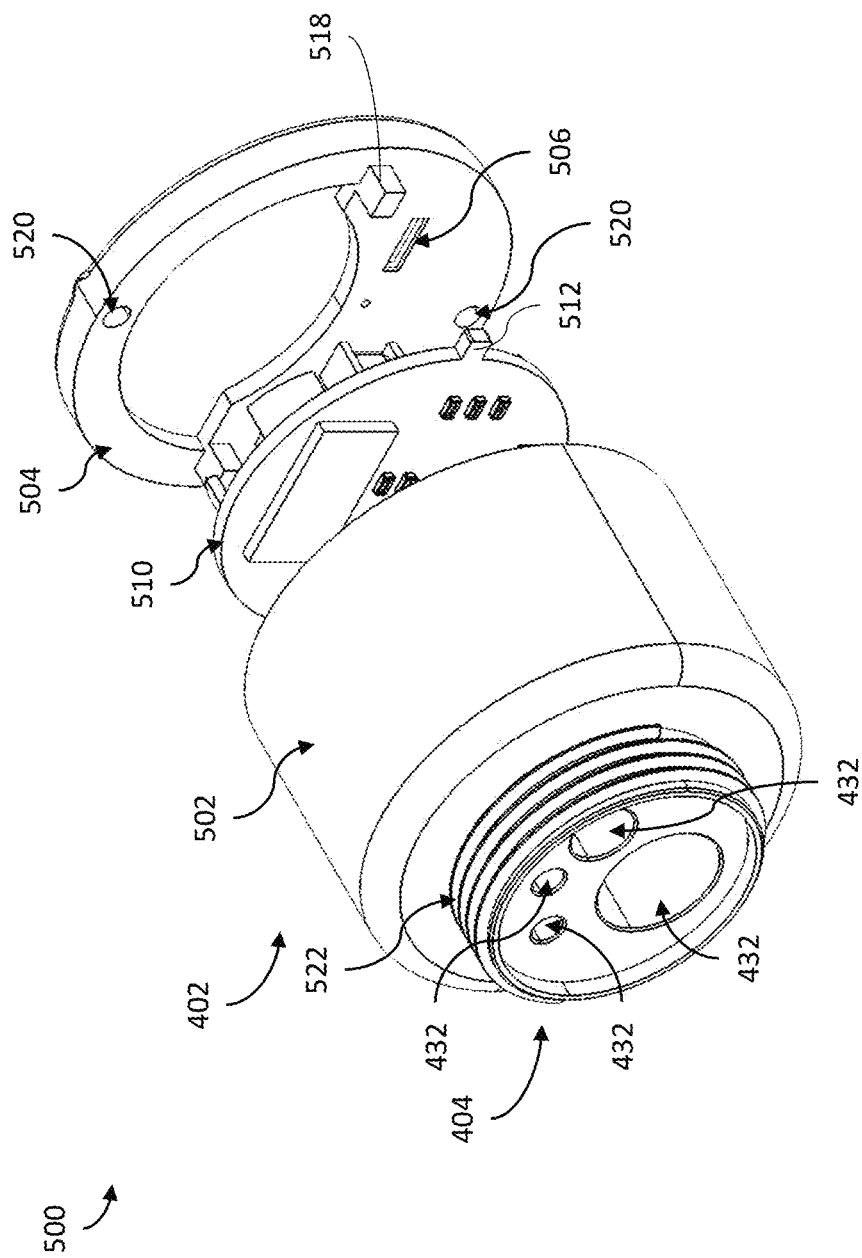
FIG. 5A is an exploded perspective view of an example implementation of the weld module of FIG. 3, in accordance with aspects of this disclosure.
Figure 5B:
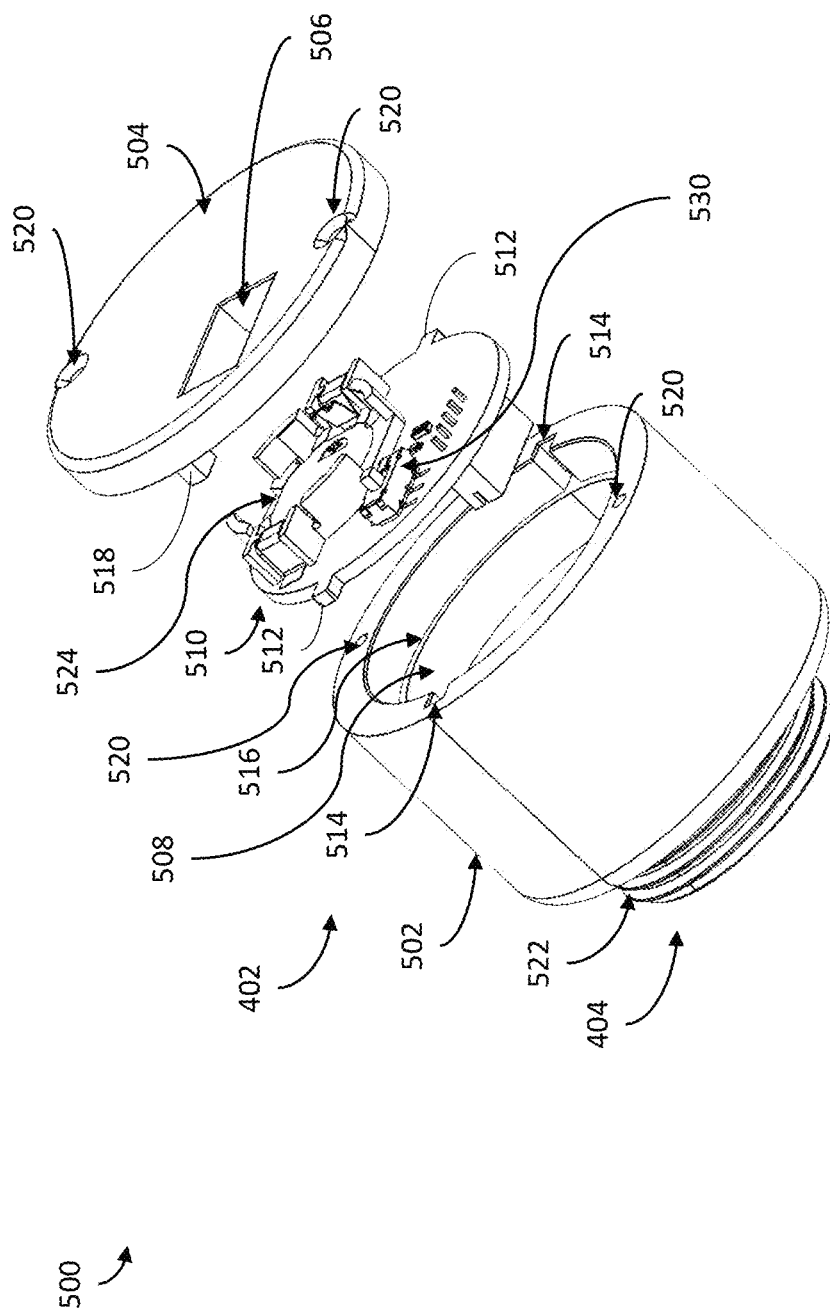
FIG. 5B is another exploded view of the example weld module of FIG. 5A, in accordance with aspects of this disclosure.

FIGS. 5A and 5B show examples of another example weld module 500. While, in the examples of FIGS. 5A and 5B, the weld module 500 does not include the plug connector 408 or fixture connector 410 of the weld module 400, the weld module 500 does share similarities with weld module 400. For example, the weld module 500 includes a housing 402, similar to the weld module 400. As shown, the housing 402 of the weld module 500 includes a generally cylindrical base 502 configured for connection to a cap 504. The cap 504 includes an aperture 506 through which an on/off switch 530 (e.g., of the UI 418) may extend. In some examples, the aperture 506 may instead be used for another input/output of the UI 418, and/or for the port 406. In the example of FIG. 5B, a hollow chamber 508 configured to retain a circuit board 510 of the weld module 500 is formed between the cap 504 and base 502. As shown, the circuit board 510 includes a terminal 524 configured to receive a battery (not shown) that may act as a power source 420 to power electrical elements of the circuit board 510. In some examples, the circuit board 510 may include and/or implement the electrical elements of the weld module 500. In some examples, the electrical elements of the weld module 500 may include some or all of the previously described electrical elements of the weld module 400 (e.g., UI 418, vibrator(s) 416, sensor(s) 414, power source 420, illuminator(s) 412, communication circuitry 422, control circuitry 424, and/or logic circuit 450).

In the examples of FIGS. 5A and 5B, the circuit board 510 is generally circular, and includes protrusions 512 formed on opposite sides of the circuit board 510. Complementary slots 514 configured to receive the protrusions 512 are formed in the base 502. The slots 514 terminate at a shelf 516. The shelf 516 narrows the diameter of the chamber 508 to less than that of the circuit board 510, so as to retain the circuit board 510 within the chamber 508. Stanchions 518 of the cap 504 are positioned to fit within the slots 514 of the base 502 as well, so as to secure the circuit board 510 against movement. Holes 520 on the cap 504 and base 502 align to fit fasteners (not shown) that securely couple the cap 504 to the base 502.

In the examples of FIGS. 5A and 5B, the base 502 is further formed with the socket connector 404. As shown, the diameter of the socket connector 404 is less than that of the base 502 and cap 504. As shown, the socket connector 404 is configured to accept a European style plug 304a. Thus, the socket connector 404 has four receptacles 432 in conformance with the configuration of the plug 304a. In the examples of FIGS. 5A and 5B, the socket connector 404 is formed with connection features 522 (i.e., screw threads) configured to engage with complementary features of the plug 304a.

FIGS. 6A-8B show examples of an alternative example weld module 800. In some examples, the weld module 800 may be configured to provide any of the functions, and/or include any of the features, discussed above with reference to the weld modules 400 and 500. In some examples, the weld module 800 may be configured for use with a mock welding tool 600, rather than a live welding tool 308 like the weld modules 400 and 500. In some examples, specialized mock welding tools may be a better option than live welding tools. For instance, where conventional live welding tools are needed for live welding, it may be more efficient to use a mock welding tool rather than a live welding tool for weld training. However, the computing device 204 of the weld training system 200 may still need to know when a trigger of the welding tool is activated and/or deactivated in order to conduct a weld training simulation, regardless of whether a live or mock welding tool is used. Thus, in some examples, the weld module 800 is configured to communicate tool event information (e.g., trigger activation/deactivation) to communication circuitry 222 of the computing device 204 when a mock welding tool is used.

Figure 6A:
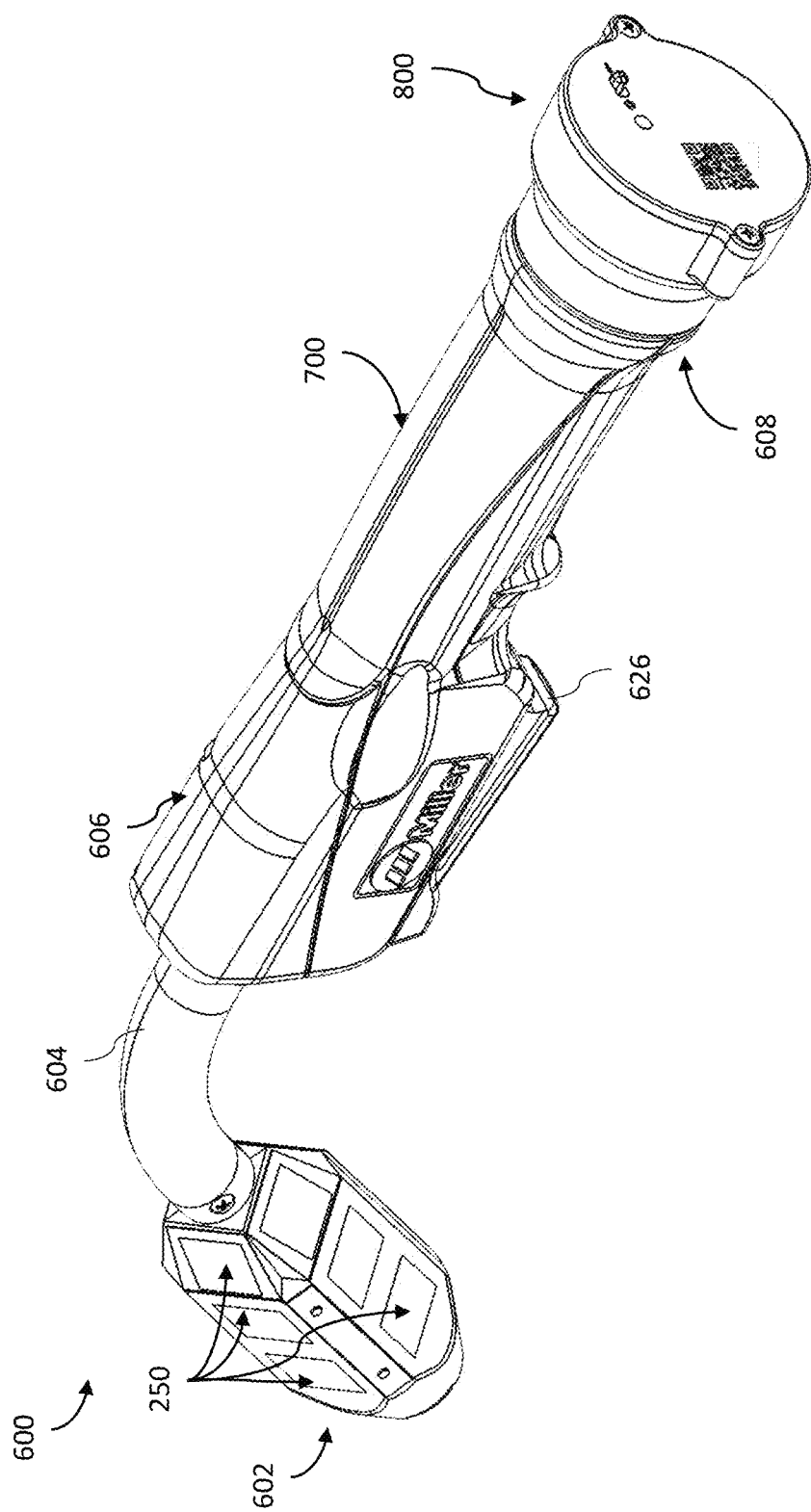
FIG. 6A shows a perspective view of an example mock welding tool having an alternative example weld module.

In the example of FIG. 6A, the mock welding tool 600 is a mock welding torch configured for mock gas metal arc welding (GMAW). In some examples, the mock welding tool 600 may instead be a mock torch configured for mock gas tungsten arc welding (GTAW) or a mock gun configured for mock flux-cored arc welding (FCAW). As shown, the mock welding tool 600 has a nozzle 602 with markers 250 disposed on the nozzle 602. The nozzle 602 is attached to a neck 604 that leads to a handle 606. In some examples, the handle 606 and/or nozzle 602 may be weighted to add heft to the mock welding tool 600, making the mock welding tool 600 feel heavier and/or more realistic. As shown, a trigger 626 is movably attached to the handle 606. In some examples, activation (e.g., squeezing, moving, actuation, etc.) of the trigger 626 may close one or more switches (e.g., switch 460), while deactivation of the trigger 626 may open the switch(es).

In the example of FIG. 6A, the alternative weld module 800 is attached to the mock welding tool 600 at an end 608 of the handle 606, opposite the neck 604. In live welding tools (e.g., the welding tool 308a and/or 308d), this end 608 is where a cord might extend out of the welding tool, leading to a plug 304. One of the benefits of using a mock welding tool 600, as opposed to a live welding tool, is that there is no need for an inconvenient cord that can get tangled or a cumbersome plug 304. Because there is no cord or plug 304 for the mock welding tool 600, the weld module 800 may be conveniently attached to the end of the handle 606 of the welding tool 600.

Despite the lack of a cord or plug 304, the weld module 800 may still be in electrical communication with a switch 460 activated by the trigger 626. For example, the mock welding torch 600 may include an internal plug similar to plug 304 that is configured to connect to a socket connector 804 of the weld module 800 (see, e.g., FIG. 8A). In some examples, the mock welding torch 600 may include internal wiring directly connecting a switch 460 activated by the trigger 626 to the weld module 800 (e.g., via socket connector 804 and/or some other part of the weld module 800). Thus, an electrical connection between the switch 460 and the weld module 800 may still be made, even in the absence of an external cord and plug 304.

FIGS. 6B-8A show how the weld module 800 may be integrally coupled to the end of the welding tool 600. In some examples, the weld module 800 may be integrally molded with an end of the handle 606 of the welding tool 600. In some examples, the weld module 800 and handle 606 of the mock welding tool 600 may have complementary connecting and/or locking features that facilitate connection and/or interlocking of the weld module 800 and handle 606. In some examples, a separate panel 700 additionally secures the weld module 800 to the handle 606.

Figure 8A:
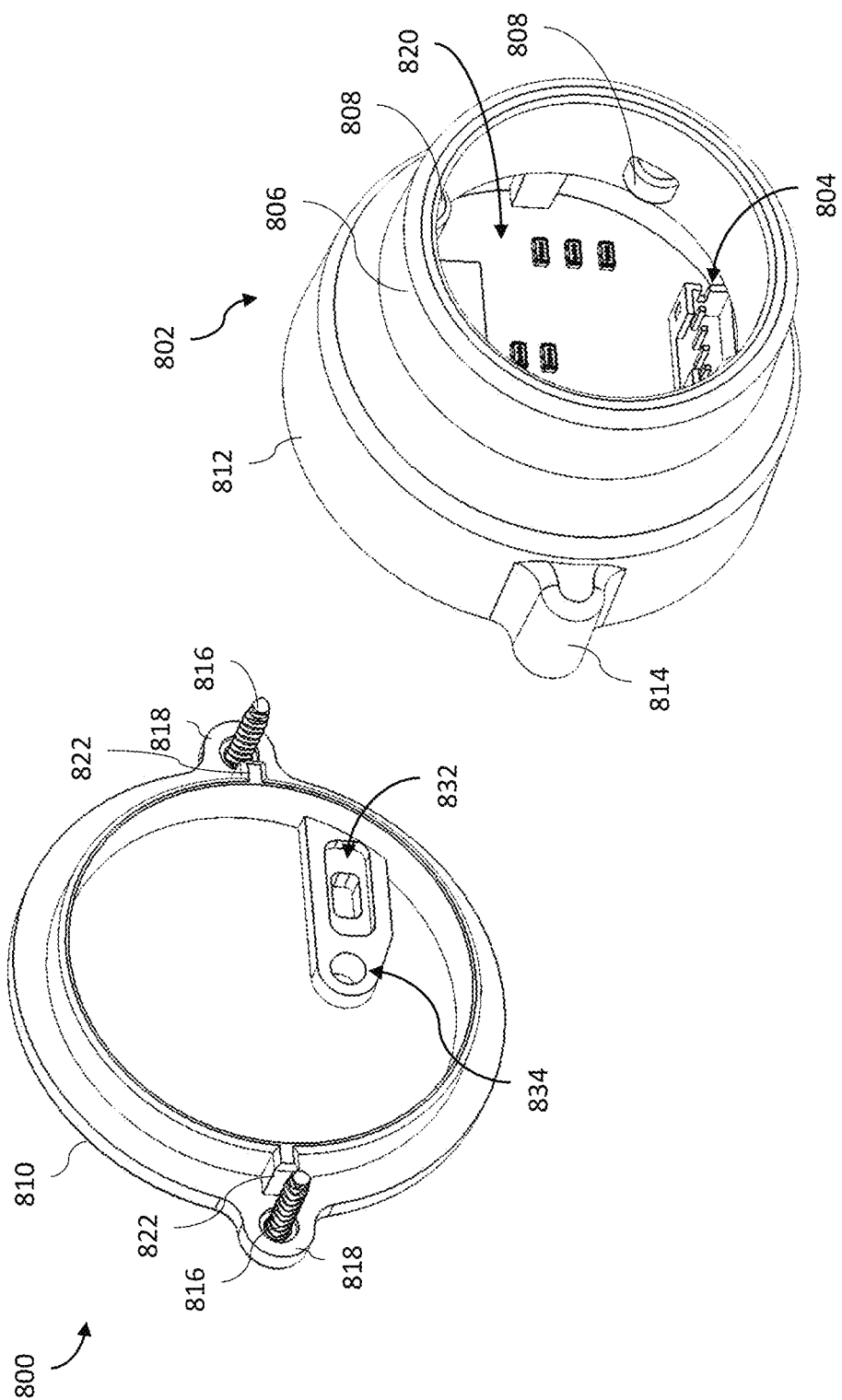
FIG. 8A is a perspective view of a first side of the example weld module of FIG. 6A.

FIG. 8A shows the connecting and/or locking features of the weld module 800. In particular, FIG. 8A shows several protuberances 808 protruding from an interior surface of a connecting portion 806 of a housing 802 of the weld module 800. As shown, the protuberances 808 are spaced approximately ninety degrees apart. While only two protuberances 808 are shown in the example of FIG. 8A due to the view, in some examples, there may be more protuberances 808, such as, for example, four protuberances 808 equally spaced around the interior of the connecting portion 806. In some examples, the protuberances 808 of the weld module 800 may be used as connecting and/or locking mechanisms configured to connect and/or interlock with complementary connecting and/or locking mechanisms of the handle 606.

Figure 6B:
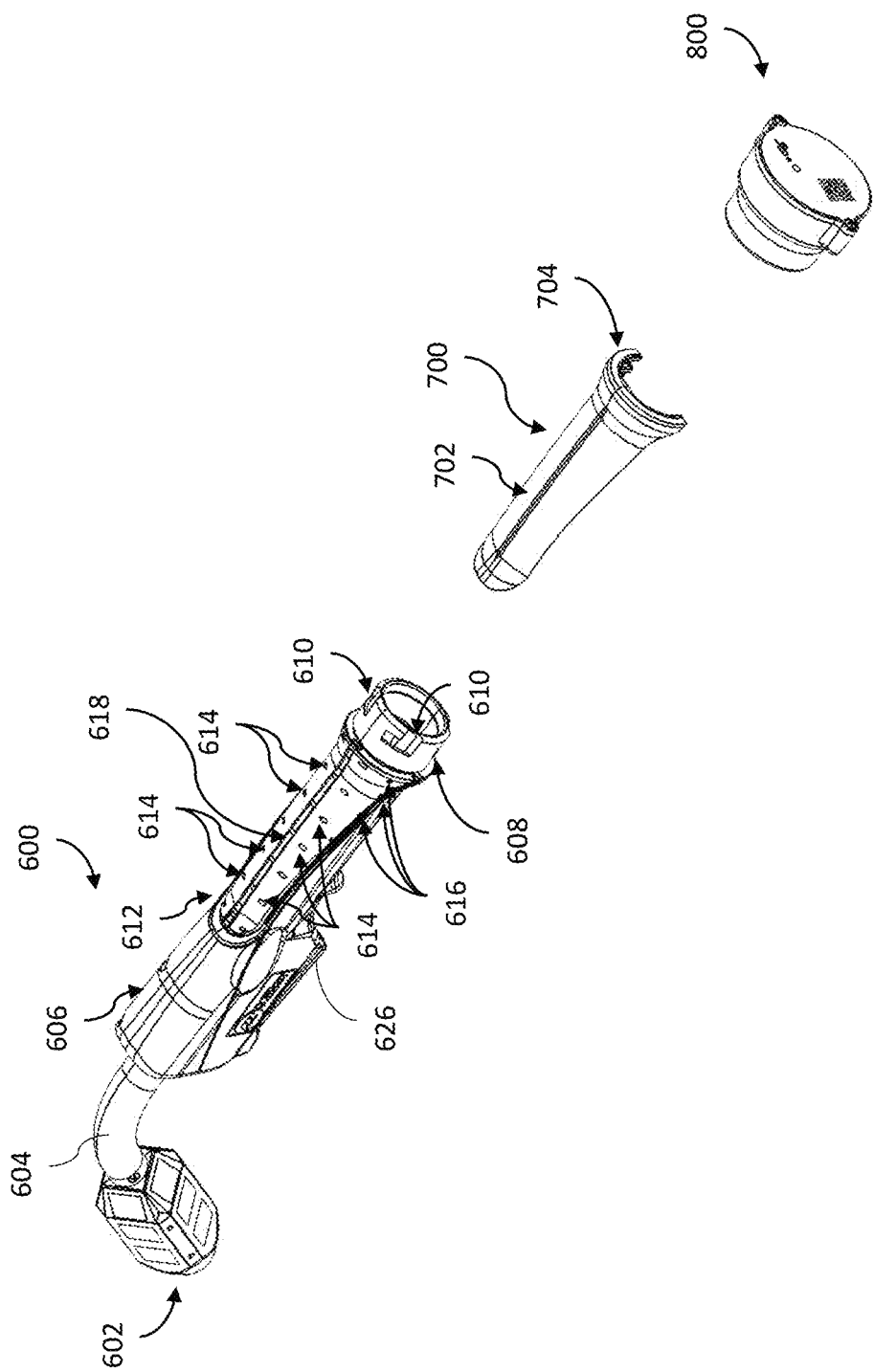
FIG. 6B shows an exploded perspective view of the example mock welding tool of FIG. 6A.

In the example of FIG. 6A, the handle 606 of the mock welding tool 600 has a connecting end 608 that is generally cylindrical. As shown, the connecting end 608 includes several channels 610 formed in the outer surface of the connecting end 608. Each channel 610 has a first portion and second portion formed at right angles to one another, providing an L shape. As shown, the channels 610 are spaced approximately ninety degrees apart. While only two channels 610 are shown in the example of FIG. 6B due to the view, in some examples, there may be more channels 610, such as, for example, four channels equally spaced around the exterior surface of the connecting end 608. In some examples, the channels 610 of the connecting end 608 may be complementary to the protuberances 808 of the weld module 800.

In some examples, the weld module 800 may be attached to the handle 606 by aligning the protuberances 808 with the channels 610, pushing the weld module 800 and handle 606 together, and then rotating the weld module 800 with respect to the handle 606. When the channels 610 and protuberances 808 are aligned and the weld module 800 and handle 6060 are moved together, the protuberances 808 may move along the first portion of the channels 610. Subsequently twisting or rotating the weld module 800 relative to the handle 606 may move the protuberances 808 along the second portion of the channel 610. While in the second portion of the channels 610, the frictional fit of the protuberances 808 within the channels 610 may prevent the weld module 800 from uncoupling from the handle 606.

In the examples of FIG. 6A-6B, the mock welding tool 600 also includes a panel 700 to secure the weld module 800 in place against accidental rotation and/or removal from the handle 606. As shown, the panel 700 is a solid, generally elongated, and curved piece. In some examples, the panel 700 may be a piece of plastic. As shown, the curvature of the panel 700 at an elongated first portion 702 is generally complementary to the curvature of the handle 606. The curvature of the panel 700 at a hemispherical second portion 704 is generally complementary to the curvature of the connecting portion 806 of the weld module 800. In some examples, the second portion 704 of the panel 700 is configured to fit over and/or frictionally retain in place the connecting portion 806 of the weld module 800 when the weld module 800 is connected to the handle 606.

In the example of FIG. 6B, a recessed portion 612 is formed on a rear of the handle 606, proximate the connecting end 608. The recessed portion 612 is shaped complementary to the panel 700, and is configured to receive the panel 700. As shown, the recessed portion 612 includes a pattern of indents 614 and holes 616 arranged symmetrically about a groove 618 that runs lengthwise down the recessed portion 612 of the handle 606. In some examples, the groove 618, indents 614, and/or holes 616 of the recessed portion 612 may comprise coupling features configured to interface with complementary coupling features of the panel 700, so as to secure the panel 700 to the handle 606.

Figure 7:
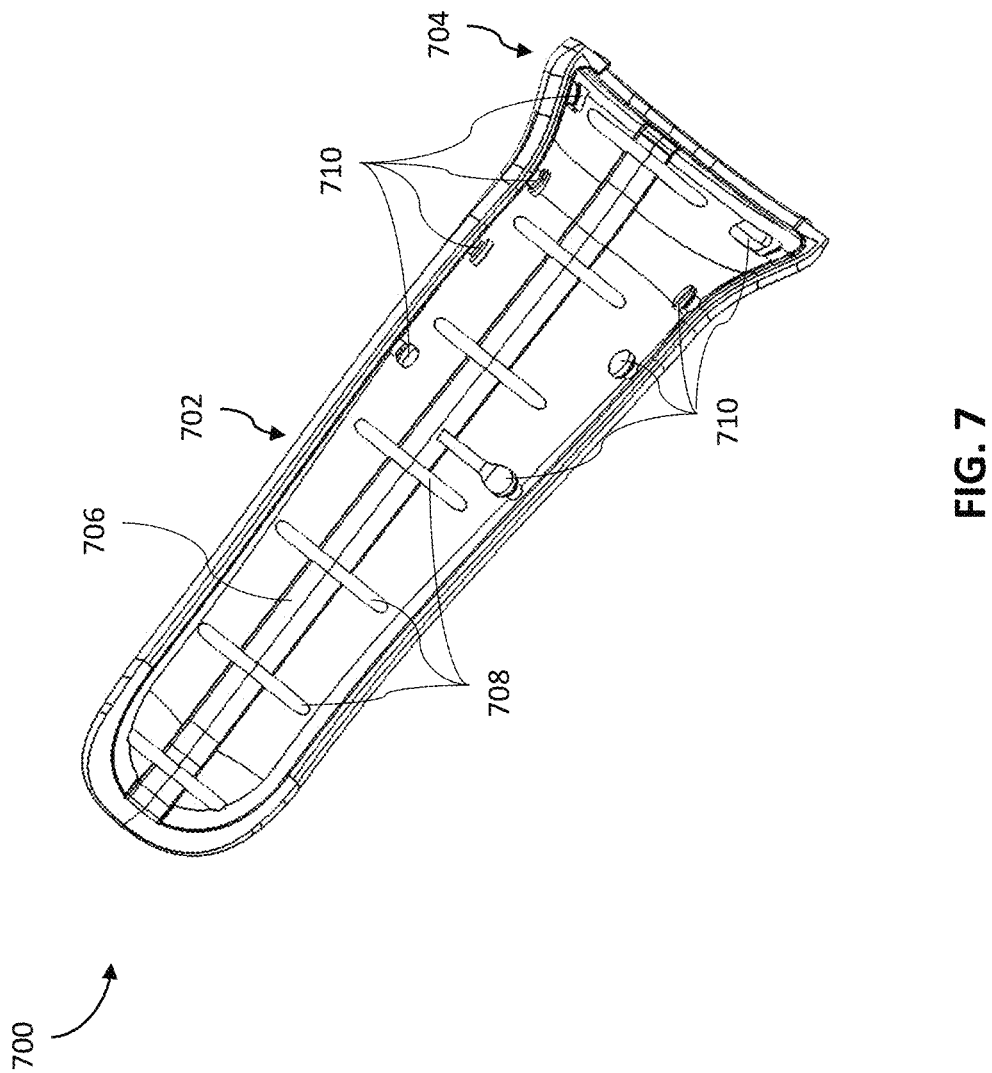
FIG. 7 shows an underside of a panel connecting an alternative example weld module to the example mock welding tool of FIG. 6A.

FIG. 7 shows a view of an underside of the panel 700. As shown, the underside of the panel 700 includes a spine 706 extending along a length of the panel 700 through an approximate center. Ribs 708 are arranged along the spine 706, with each rib 708 extending perpendicular to the spine 706 such that approximately equal portions of each rib 708 extend from opposite sides of the spine 706. Proximate an inflection point of the panel 700, where the elongated first portion 702 begins to flare out to the hemispherical shape of the second portion 704, there are formed several pairs of tabs 710 arranged along opposite edges of the underside of the panel 700. In some examples, the spine 706, ribs 708, and/or tabs 710 of the panel 700 formed on the underside of the panel 700 may comprise complementary coupling features configured to interface with coupling features of the handle 606, so as to secure the panel 700 to the handle 606 (and secure the handle 606 to the weld module 800).

FIGS. 8A-8B show the weld module 800 with a cover 810 removed from the housing 802. As shown, the housing 802 of the weld module 800 is generally hollow and cylindrical. The housing 802 includes the connecting portion 806 and a base 812 that has a diameter that is larger than that of the connecting portion 806. The base 812 includes receptacles 814 having apertures 815 configured to receive fasteners 816. When the fasteners 816 are inserted through wings 818 of the cover 810 they may be used to connect the cover 810 to the housing 802 via the receptacles 814. In the example of FIG. 8B, the cover 810 is shown disconnected from the housing 802, revealing a circuit board 820 fit into a hollow chamber in the base 812 of the housing 802.

In the example of FIGS. 8A-8B, the circuit board 820 is similar to the circuit board 510 of the weld module 500. For example, the circuit board 820 is also generally circular, with protrusions 813 formed on opposite sides of the circuit board 820. Complementary slots 817 that receive the protrusions 815 are formed in the base 812. In some examples, the base 812 may also have a similar shelf supporting the circuit board 820. Stanchions 822 of the cover 810 are positioned to fit within the slots 817 of the base 812 as well, so as to secure the circuit board 820 against movement. In the example of FIG. 8B, the circuit board 820 further includes a terminal 824 configured to receive a battery (not shown) that may act as a power source 420 to power electrical elements of the circuit board 820. In some examples, the circuit board 820 may include and/or implement the electrical elements of the weld module 800. In some examples, the electrical elements of the weld module 800 may include some or all of the electrical elements of the weld module 400 (e.g., UI 418, vibrator(s) 416, sensor(s) 414, power source 420, illuminator(s) 412, communication circuitry 422, control circuitry 424, and/or logic circuit 450).

In the example of FIG. 8B, the circuit board 820 also includes an illuminator 826 which may be similar or identical to the illuminator 412 of the weld module 400. The circuit board 820 further includes a switch 830 that may be used as an input mechanism of the UI 418. As shown, the cover 810 includes a window 832 through which the switch 830 may extend, and a port 834 through which illumination of the illuminator 826 may be seen. The cover 810 also includes an identifier 836 that may be used to assist with communicative pairing of the weld module 800 with the computing device 204. As shown, the identifier 836 is a QR code, though, in some examples, the identifier 836 may instead be a bar code and/or serial number.

Figure 9:
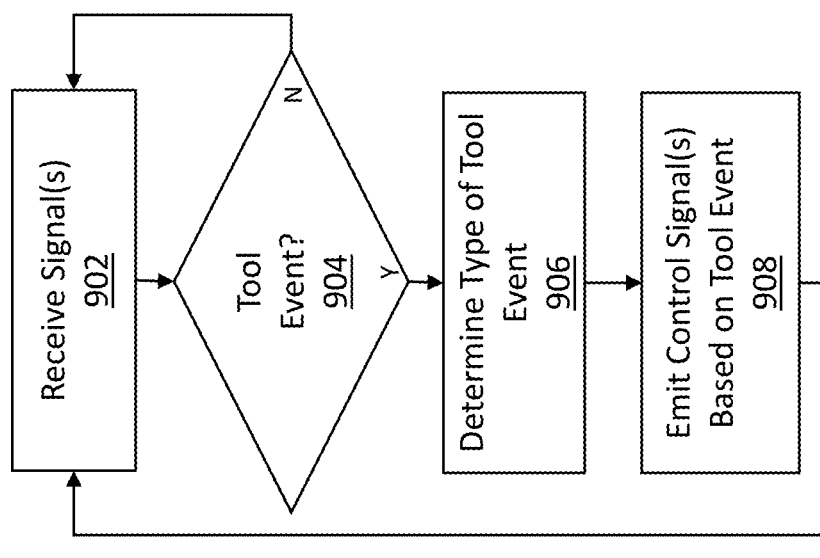
FIG. 9 is a flow diagram illustrating an example control process of a weld module.

FIG. 9 is a flowchart illustrating an example control process 900900 that may be used with any of the weld modules 400, 500, 800. In some examples, some or all of the control process 900 may be implemented in machine readable instructions stored in memory 426 and/or executed by the one or more processors 428. In some examples, some or all of the control process 900 may be implemented in analog and/or discrete circuitry of the control circuitry 424.

At block 902, the control process 900 receives one or more signals. In some examples, the signal(s) may be received from a welding tool 308 or 600, such as, for example, via the connection of plug 304 and socket connector 404 or 804. For example, the signal(s) may be indicative of a trigger 326, trigger 626, and/or pedal 310 activation, deactivation, and/or pressure. In some examples, the signal(s) may be received from the port 406, the UI 418, and/or the communication circuitry 422. For example, the signal(s) may be indicative of a communication from communication circuitry 222 of the computing device 204, communication from some device attached via port 406, and/or an input from the user (e.g., to simulate a tool event).

In the example of FIG. 9, the control process 900 determines whether the signal(s) is indicative of a tool event at block 904. If not, then the control process 900 returns to block 902. If so, then the control process proceeds to block 906, where the control process 900 determines the type of tool event. As shown, the control process 900 proceeds to block 908 after block 906.

In the example of FIG. 9, the control process 900 emits one or more control signals based on the tool event (and/or type of tool event) at block 908. In some examples, the control signal(s) may be to the communication circuitry 422. For example, the control signal(s) may be indicative of the tool event (and/or type of tool event) so that the communication circuitry 422 can send an appropriate communication signal to the computing device 204 indicative of the tool event (and/or type of tool event). In some examples, the communication circuitry 422 may additionally (or alternatively) send sensor 414 information to the computing device 204. In some examples, the illuminator(s) 412 may be controlled to light up and/or blink when the communication circuitry 422 is transmitting and/or receiving information, so as to provide a visual indication to the user. In some examples, the computing device 204 may use the tool event (and/or tool event type) information, and/or sensor information, to conduct the weld training simulation. For example, in response to one or more communication signals indicating a trigger 326, trigger 826, or pedal 310 activation or deactivation, the computing device 204 may render appropriate virtual objects (e.g., virtual arc, virtual weld bead, etc.) based on set welding parameters and/or a target training activity.

In some examples, the control signal(s) emitted at block 908 may be to the UI 418 to display and/or otherwise output certain information (e.g., status information). In some examples, the control signal(s) may be to the vibrator(s) 416, to initiate a vibration at a certain frequency and/or amplitude based on type of tool event and/or one or more simulation characteristics stored in memory, set via the UI 418, and/or communicated from the computing device 204. In some examples, simulation characteristics may include, for example, weld settings (e.g., current, voltage, wire feed speed, etc.), arc properties, workpiece properties, difficulty settings, and/or other appropriate settings of the simulation. In some examples, the control signal(s) may be to the illuminator(s) 412 to light up and/or blink to indicate the tool event (and/or type of tool event). As shown, the control process 900 returns to block 902 after block 908.

As discussed above, the weld module 400 and weld module 500 present efficient and/or cost effective ways to adapt conventional weld equipment for training. Adapting conventional equipment may help to add to the realism and/or applicability of the training, while also saving on time and/or money. Alternatively, where specialized mock welding equipment is instead called for, the weld module 800 presents an effective means for adapting the specialized welding equipment for training. Thus, the present disclosure contemplates using weld modules to connect with conventional or specialized welding equipment, so as to integrate the welding equipment into a weld training system.

The present methods and systems may be realized in hardware, software, and/or a combination of hardware and software. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein, the terms "approximate" and/or "approximately," when used to modify or describe a value (or range of values), position, shape, orientation, and/or action, mean reasonably close to that value, range of values, position, shape, orientation, and/or action. Thus, the examples described herein are not limited to only the recited values, ranges of values, positions, shapes, orientations, and/or actions but rather should include reasonably workable deviations.

As utilized herein, the terms "e.g.," and "for example" set off lists of one or more non-limiting examples, instances, or illustrations.

As used herein, the terms "couple," "coupled," "attach," "attached," "connect," and/or "connected" refer to a structural and/or electrical affixing, joining, fasten, linking, and/or other securing.

As utilized herein the terms "circuits" and "circuitry" refer to physical electronic components (i.e. hardware) and/or any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As utilized herein, circuitry is "configured" to perform a function whenever the circuitry comprises the necessary hardware and code (if any is necessary) to perform the function, regardless of whether performance of the function is disabled or not enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

While the present method and/or system has been described with reference to certain implementations, it will be understood by those skilled in the art that various changes may be made and equivalents may be substituted without departing from the scope of the present method and/or system. For example, blocks and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A mock welding tool, comprising:
    a handle having a trigger and an end portion, the end portion comprising a connection feature;
    a communication module housing comprising a complementary connection feature that engages with the connection feature of the end portion of the handle to removeably couple the communication module housing to the end portion of the handle; and
    wireless communication circuitry enclosed within the communication module housing, the wireless communication circuitry configured to wirelessly send one or more signals to a computing system in response to activation of the trigger.

2. The mock welding tool of claim 1, wherein a trigger signal is generated when the trigger is activated and the wireless communication circuitry is configured to receive the trigger signal.

3. The mock welding tool of claim 2, further comprising a trigger circuit configured to generate the trigger signal when the trigger is activated.

4. The mock welding tool of claim 1, wherein the connection feature comprises a channel formed on the end portion of the handle, the complementary connection feature comprising a protuberance extending from the communication module housing.

5. The mock welding tool of claim 4, wherein the channel is formed on an outer surface of the end portion of the handle, or the protuberance extends from an inner surface of the communication module housing.

6. The mock welding tool of claim 1, wherein the communication module housing further comprises an identifier that assists in communicatively pairing the mock welding tool with the computing system.

7. The mock welding tool of claim 1, wherein the communication module housing comprises a base that retains the wireless communication circuitry and a cover configured to attach to the base.

8. The mock welding tool of claim 1, further comprising an illuminator configured to provide illumination when the wireless communication circuitry is powered, paired, transmitting, or receiving.

9. The mock welding tool of claim 1, further comprising a vibrator configured to vibrate in response to a vibration signal.

10. The mock welding tool of claim 1, further comprising a sensor configured to measure a position, orientation, or motion of the communication module housing, wherein the wireless communication circuitry is configured to transmit a signal indicative of the position, orientation, or motion.

11. A mock welding tool, comprising:
    a handle having a trigger, a first end, and a second end, the trigger being positioned between the first end and the second end, and the first end comprising a connection feature;
    a communication module housing comprising a complementary connection feature that engages with the connection feature of the first end of the handle to removeably couple the communication module housing to the first end of the handle; and wireless communication circuitry enclosed within the communication module housing, the wireless communication circuitry being configured to wirelessly send one or more signals to a computing system in response to activation of the trigger.

12. The mock welding tool of claim 11, further comprising a trigger circuit configured to generate a trigger signal when the trigger is activated.

13. The mock welding tool of claim 12, wherein the trigger circuit is in electrical communication with a switch that is configured to open or close in response to activation of the trigger.

14. The mock welding tool of claim 11, wherein the connection feature comprises a channel formed on the first end of the handle.

15. The mock welding tool of claim 14, wherein the complementary connection feature comprises a protuberance extending from the communication module housing.

16. The mock welding tool of claim 15, wherein the channel is formed on an outer surface of the first end of the handle.

17. The mock welding tool of claim 16, wherein the protuberance extends from an inner surface of the communication module housing.

18. The mock welding tool of claim 11, further comprising a torch neck connected to the second end of the handle.

19. The mock welding tool of claim 11, wherein the communication module housing comprises a base that retains the wireless communication circuitry and a cover configured to attach to the base, the cover of the communication module housing having an identifier that assists in communicatively pairing the mock welding tool with the computing system.

20. The mock welding tool of claim 11, further comprising a sensor configured to measure a position, orientation, or motion of the communication module, wherein the wireless communication circuitry is configured to transmit a signal indicative of the position, orientation, or motion.

* * * * *